Oct. 11, 1938.   P. H. JONES   2,132,736
DRILLING FLUID TESTER SCALE
Filed April 20, 1936
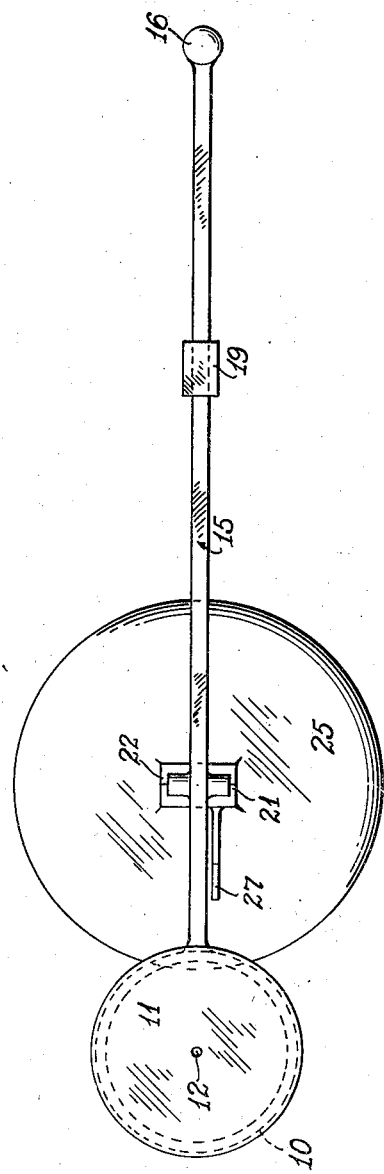
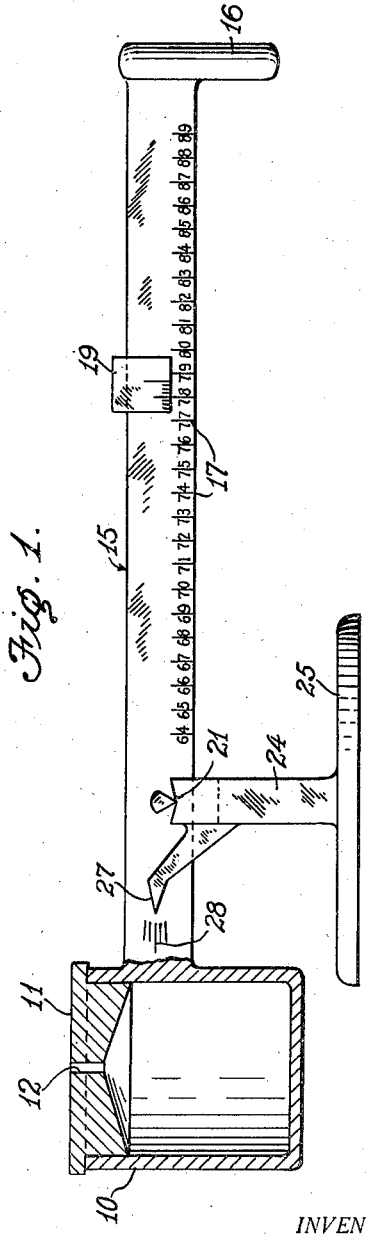
INVENTOR.
Philip H. Jones
BY Lyle Dillon
ATTORNEY.

Patented Oct. 11, 1938

2,132,736

UNITED STATES PATENT OFFICE 2,132,736

DRILLING FLUID TESTER SCALE

Philip H. Jones, Redondo Beach, Calif.

Application April 20, 1936, Serial No. 75,362

2 Claims. (Cl. 265—49)

This invention relates to weighing apparatus and particularly to apparatus for determining the density or weight of liquids.

In modern oil well drilling practices it is recognized that the numerous characteristics or properties of the drilling fluid employed are factors of primary importance, and that accurate control of these properties must be maintained.

Drilling fluid comprising heavy solids in suspension in water, known as drilling mud, is usually employed in oil well drilling. This drilling mud possesses a number of properties, such as viscosity, plasticity, thixotropy, and density of weight, all of which are factors contributing to the degree of success or failure of drilling operations. The weight or density of the drilling fluid is not only a particularly important characteristic in itself but the other properties of the fluid are also more or less correlated functions.

It is obviously desirable therefore to maintain accurate control of the density of the drilling fluid and in order to accomplish this it is necessary to have an approximately continuous record of drilling fluid weights throughout drilling operations. Because of the thixotropic or jell forming properties of drilling fluids it is not practicable to make their density determinations by the use of the simple hydrometer as is customary for such determinations of other common liquids.

The object of this invention is, therefore, to provide practical means for readily and accurately determining the weights or densities of fluids such as drilling muds.

The invention comprises in brief, apparatus for measuring and testing a unit quantity of drilling fluid and directly indicating its weight or density.

The invention will be more fully apparent from the following description of a preferred embodiment thereof in which Figs. 1 and 2 are side elevation and plan view of the instrument, respectively.

Referring to the drawing, 10 is a cup like receptacle adapted to contain an accurately determined volume of the drilling fluid to be weighed, and having a top 11 in which is provided a small centrally located vent hole 12. The receptacle 10 is attached by its side to one end of a laterally extending graduated balance arm 15, having at its opposite end a counterweight 16. The arm 15 is provided along a portion of its length with calibrated graduations 17 which may read in convenient units such as density, weight per cubic foot or weight per gallon of measured fluid. A slide weight 19 having vernier graduations adapted to register with the graduations 17 may be moved along the length of the arm 15 to provide a balancing weight adjustment and to simultaneously indicate the reading point on the weight scale 17 for such a condition of balance.

The arm 15 is also provided with a knife edge pivot which rests at either end upon V-shaped fulcrums 21 and 22 provided in the upper divided end of an upright member 24 which is in turn vertically supported by a base 25. A pointer 27 is attached to the upright support 24 to indicate upon suitable graduations 28 on the side of the balance arm, when the proper balance of the apparatus has been obtained by the adjustment of the position of the slide weight 19. This adjustable weight 19 is preferably attached to the arm 15 so that it is free to slide along the length thereof but cannot be removed.

The operation of the apparatus is as follows: The portion of the instrument including the receptacle 10, arm 15 and weights 16 and 19 is removed from its support 24 and, with the top 11 removed the receptacle 10 is completely filled with a typical sample of the drilling fluid to be weighed. The top 11 is then forced into position resulting in the excess mud being expelled from from the receptacle through the vent hole 12. The volume of the fluid sample remaining in the instrument is thus accurately determined. The mud or other extraneous matter which may adhere to the outside of the instrument after it has been filled and closed by the top is then removed in any suitable manner such as by washing under a stream of clean water and/or by wiping. The balance portion of the instrument including the arm 15, top 11, weights 16 and 19 and receptacle 10 containing the sample of fluid to be weighed is next replaced with its pivots upon the support 24—25 and a balance obtained by proper adjustment of the said slide weight 19, said balance being indicated by registration of pointer 27 upon the proper graduation mark 28. The position of the thus adjusted vernier slide weight 19 with respect to the calibrated graduations 17 on the balance arm then indicates the weight or density readings of the mud sample.

An advantage of this instrument is that it can be readily handled and accurately and rapidly operated under conditions in the field where other common weighing apparatus would be unsuitable.

It is to be noted that the balance when removed from the support and with the top 11 detached from the receptacle 10, forms a dipper-like structure which may be handled as such, facilitating obtaining from the mud ditch or other accessible source, typical circulating drilling fluid samples. The top 11 when replaced, limits and accurately determines the quantity of the sample thus obtained for weighing while at the same time enabling the instrument subsequently to be readily freed of adhering mud without the danger of spilling, diluting or otherwise vitiating the said typical fluid sample obtained for measurement. The top 11, instead of having a press fit into the receptacle 10 as illustrated herein may be constructed with threads and be adapted to screw into the receptacle top with equally satisfactory results.

The arm 15 which serves as a handle for the dipper-like device has an offset end formed by the counterweight 16 which serves to limit the danger of allowing the instrument to slip from muddy or oily hands while obtaining a fluid sample and at the same time forms a supporting leg which, when the instrument is set upon a level flat surface maintains the arm 15 in a normal horizontal attitude and the receptacle in an upright position.

The description herein is not limiting but is merely illustrative of a preferred apparatus and other variations are obviously possible within the scope of the invention and the claims.

I claim:

1. Apparatus for weighing liquids comprising a receptacle adapted to contain a measured volume of liquid, a balance arm rigidly attached to and laterally extending from said receptacle and forming a dipper-like structure, an off-set fixed weight member at the opposite end of said balance arm to form a handle for said dipper-like structure, means to substantially close the receptacle and to exactly define said measured volume of contained liquid, a fixed pivot means on said balance arm intermediate the receptacle and the off-set weight member, means to support said structure upon said fixed pivot means and adjustable weight means on said arm to balance said dipper-like structure upon said pivot support when the receptacle contains the measured volume of liquid and a pointer on the supporting means cooperating with a scale on said balance arm to indicate a balance of said structure upon said pivot support.

2. Apparatus for weighing liquids comprising a receptacle adapted to contain a measured volume of liquid, a balance arm rigidly attached to and laterally extending from said receptacle and forming a dipper-like structure, an off-set fixed weight member at the opposite end of said balance arm and extending below said arm a distance substantially equal to that of said receptacle, means to substantially close the receptacle and to exactly define said measured volume of contained liquid, a fixed pivot means on said balance arm intermediate the receptacle and the off-set weight member, means to support said structure upon said fixed pivot means and adjustable weight means on said arm to balance said dipper-like structure upon said pivot support when the receptacle contains the measured volume of liquid and a pointer and scale balance indicating means to indicate a balance of said structure upon said pivot support.

PHILIP H. JONES.